Sept. 6, 1966     A. J. BACHELDER     3,270,653

COMPOSITE PHOTOGRAPHIC FILM ROLL

Filed Nov. 14, 1963     3 Sheets-Sheet 1

INVENTOR.
Albert J. Bachelder
BY
Brown and Mikulka
ATTORNEYS

Sept. 6, 1966        A. J. BACHELDER        3,270,653

COMPOSITE PHOTOGRAPHIC FILM ROLL

Filed Nov. 14, 1963        3 Sheets-Sheet 2

INVENTOR.
Albert J. Bachelder
BY
Brown and Mikulka
ATTORNEYS

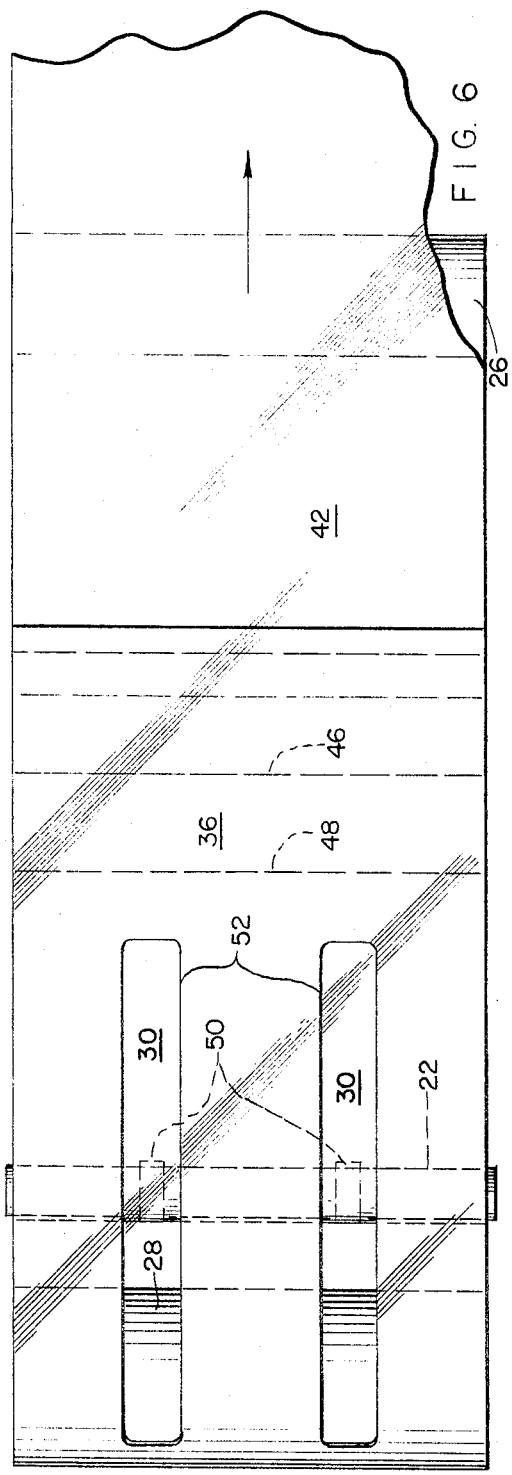
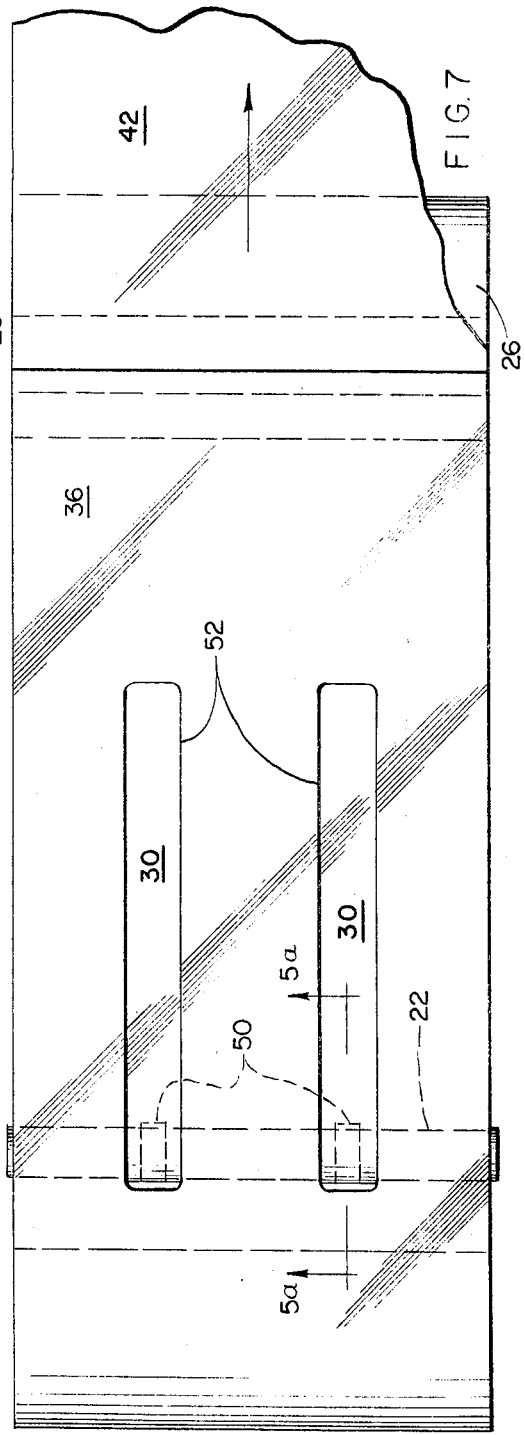

United States Patent Office 3,270,653
Patented Sept. 6, 1966

3,270,653
COMPOSITE PHOTOGRAPHIC FILM ROLL
Albert J. Bachelder, Lexington, Mass., assignor to Polaroid Corporation, Cambridge, Mass., a corporation of Delaware
Filed Nov. 14, 1963, Ser. No. 323,686
10 Claims. (Cl. 95—89)

This invention relates to an improved photographic film roll of the type comprising a plurality of rolls of flexible sheet materials adapted to be drawn in predetermined positional relationship to one another through photographic apparatus.

Photographic film rolls of the type shown in Wolff Patent No. 2,630,385 comprise a composite assembly of two rolls of photographic sheet material together with a suitable developing material adapted for use in photographic cameras of the type shown, for example, in Carbone et al. Patent No. 2,455,111. Suitable means are provided for advancing the two rolls through the camera and for spreading the developing agent between the rolls, whereby predetermined areas thereof may be processed. Such advancing means may conveniently comprise a flexible strip of leader material to which the two rolls are attached, whereby advancement of the leader through the camera causes the rolls to be advanced in a like manner. As will appear more fully hereinafter, the two rolls bear a predetermined longitudinal relationship to one another when extended directly from their connection with the leader. If any slack exists in one of the strips, this predetermined longitudinal relationship no longer exists and the strips are then in longitudinal misregistration.

It is a principal object of the present invention to provide a composite photographic film roll of the type described including means for preventing longitudinal misregistration of a pair of strips adapted to be drawn through photographic apparatus in a predetermined longitudinal relationship.

Another object is to provide, in a photographic product comprising a pair of strips adapted to be drawn in superposition between a pair of pressure-applying members which normally maintain the strips in frictional engagement with one another, means for reducing said frictional engagement for a predetermined portion of the travel of said strips, thus allowing one of the strips to be advanced independently of the other for such predetermined portion of travel.

A further object is to provide, in a photographic product comprising a pair of elongated strips adapted to be drawn in superposition through a pair of pressure-applying members by advancing a leader material to which both of said strips are attached, means for automatically removing any slack which may exist in one of the strips between the pressure-applying members and the leader material.

Still another object is to provide a new and improved composite photographic film roll including means for insuring that two elongated strips are maintained in a predetermined longitudinal relationship as they are drawn through photographic apparatus.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 6 and 7 are plan views of the novel film roll, illustrating the manner of advancement thereof in accordance with the present invention.

Figure 1:
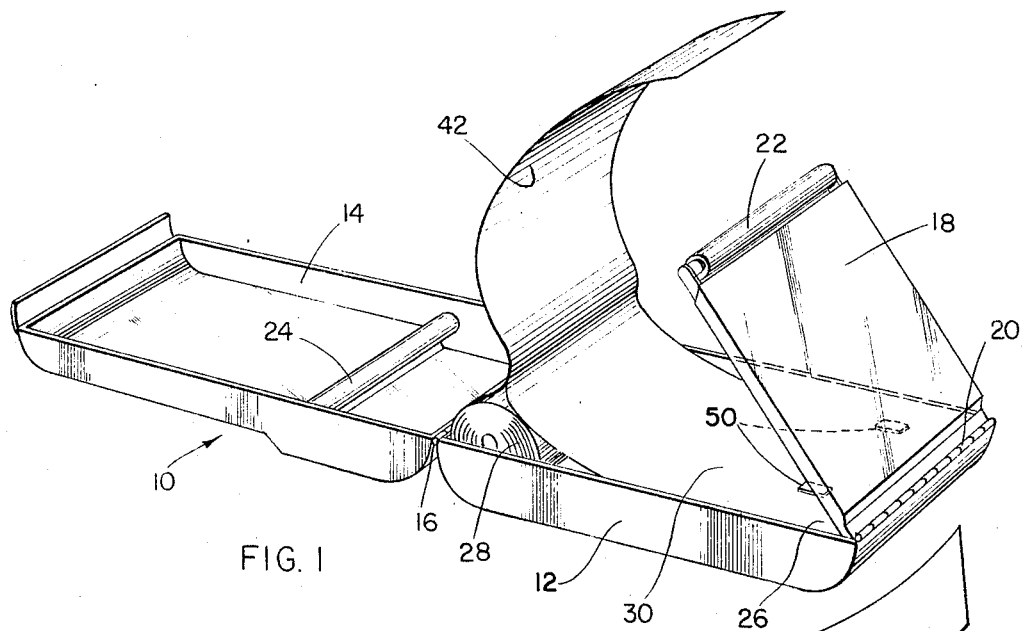
FIGURE 1 is a perspective view of the composite photographic film roll of the present invention being loaded into photographic apparatus of the type wherein it is employed.
Figure 2:
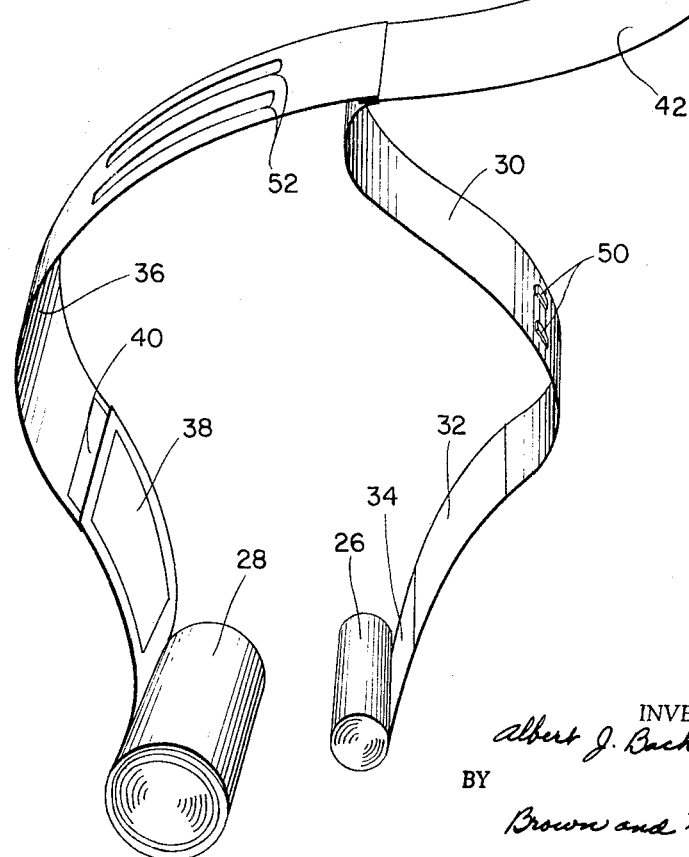
FIG. 2 is a perspective view of the film roll of the invention showing the two elongated strips in partially rolled condition.

Referring now to the drawings, shown in FIGURE 1 is a somewhat diagrammatic illustration of photographic apparatus, denoted generally by reference numeral 10, wherein the film roll of the present invention is adapted to be utilized. Photographic apparatus 10 includes first and second portions 12 and 14 hingedly connected at 16 for movement between open and closed positions relative to one another. Bridge portion 18 is connected to first portion 12 by means of hinge 20 at the opposite end of first portion 12 from its hinged connection with second portion 14. Bridge portion 18 carries, at the end thereof opposite hinge 20, a pressure-applying member in the form of roller 22. Second portion 14 carries roller 24, which is positioned adjacent roller 22 when apparatus 10 is in the closed position. Photographic apparatus 10 is shown herein for illustrative purposes only, and it is to be understood that the structural details thereof may take a variety of forms. Typical of the photographic apparatus of this type, known in the art as self-developing cameras and typified by the well-known Polaroid Land Camera, are those found, for example, in the aforementioned Carbone et al. Patent No. 2,455,111.

The photographic product of the present invention includes two elongated strips of flexible sheet material, which may be conveniently supplied in an initially rolled-up condition. First roll 26 includes photosensitive portions which may be exposed to form a latent image therein by means of photographic apparatus 10. Second roll 28 also comprises a photographic sheet material having areas adapted to be superposed with the photosensitive areas of first roll 26 to assist in photographic processing thereof. The said areas of second roll 28 are preferably adapted to receive a photographic image from the photosensitive areas of first roll 26 by means of the well-known diffusion transfer process. Second roll 28 carries a plurality of rupturable containers which releasably confine a suitable developing material which, when spread between the superposed portions of the two rolls, coacts therewith in the manner described in the aforesaid Wolff and Carbone patents to produce photographic prints.

First roll 26 includes a predetermined length of leading sheet material 30 which precedes the first photosensitive portion 32 of a plurality of such portions contained by roll 26. Between each of the photosensitive portions may be interposed an intermediate portion 34 of a non-photosensitive, flexible sheet material. Leading sheet material 30, photosensitive portion 32 and intermediate portion 34 may be attached by any convenient adhesive means. Second roll 28 also includes a predetermined length of leading sheet material 36 which precedes the first processing area 38 of a plurality of such areas carried by second roll 28. Associated with each of the processing areas is a rupturable container 40 which carries the processing agent to be spread between area 38 and area 32 as the two areas are brought into superposition in photographic apparatus 10. Both leading sheet materials 30 and 36 are affixed to a single leader 42. When the product is loaded in the apparatus in the manner illustrated in FIGURE 1, first and second rolls 26 and 28 are placed in opposite ends of first section 12, with bridge portion 18 moved about hinge 20 to a position wherein it uncovers the first section. After insertion of the film roll, bridge portion 18 is moved to a covering position with respect to leading sheet material 30. Leader 42 is then laid on top of bridge portion 18 and second portion 14 is moved about hinge 16 to the closed position, whereby the product is contained within apparatus 10 with the exception of a portion of leader 42 which extends through an opening in one end of the apparatus adjacent hinge 20.

When rolls 26 and 28 are unwound and extend in superposition to one another from their respective connections with leader 42, the predetermined lengths of leading sheet materials 30 and 36 are such that photosensitive area 32 will be in registration with processing area 38 relative to the longitudinal axes of the elongated strips comprising rolls 26 and 28. The subsequent photosensitive areas and processing areas will likewise be in longitudinal registration as rolls 26 and 28 continue to be unwound and superposed. Thus, if there is any slack in either leading sheet material 30 or leading sheet material 36 between the connection thereof with leader 42 and the first photosensitive or processing area, these areas will not be in longitudinal registration, nor will the subsequent areas. It is evident from FIGURE 1 that leading sheet material 30 must be unwound from roll 26 by a greater amount than leading sheet material 36 must be unwound from roll 28 in order to load the film roll into apparatus 10 in the manner described. There is, therefore, a greater likelihood that slack may occur in material 30 than in material 36. It is also more likely that slack in sheet material 30 would go unnoticed by an operator loading apparatus 10 since material 30 is covered by sheet material 36 and cannot be seen by an operator viewing the assembly from the top after bridge portion 18 has been positioned and before the apparatus has been closed.

Figure 3:
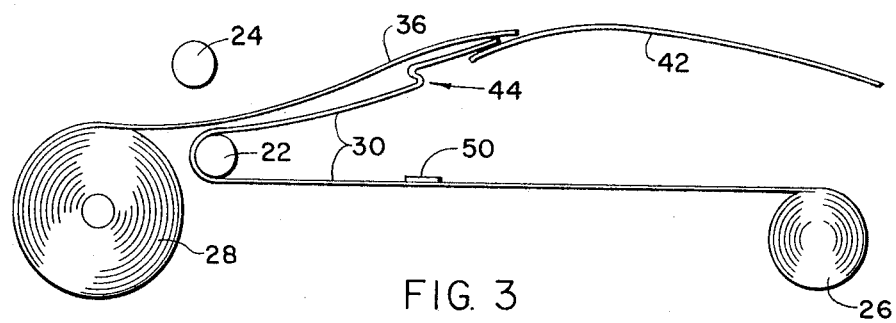
FIGS. 3–5 are side elevational views of the film roll of the invention shown in various stages of advancement between a pair of pressure-applying members.
Figure 4:
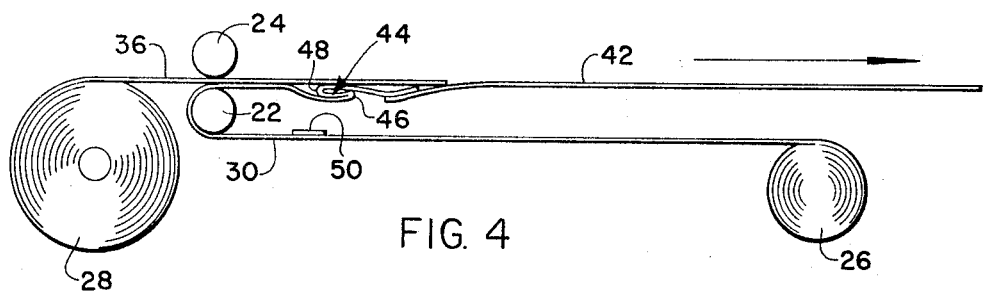
Figure 5:
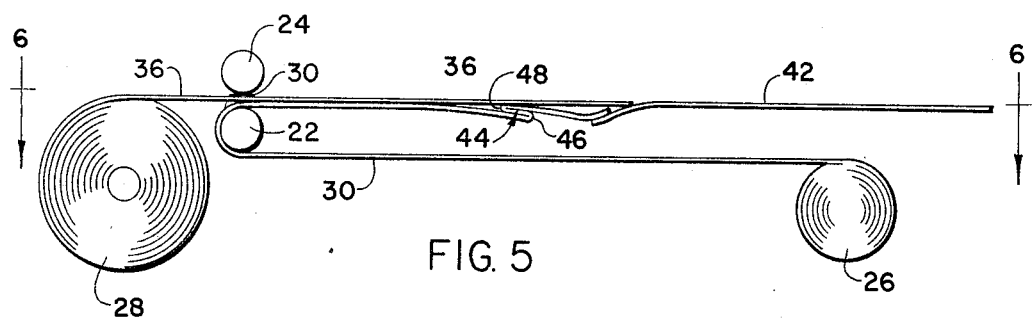

This condition is illustrated more fully in FIGS. 3–5. In FIG. 3 the positions of the various elements are illustrated just prior to movement of second portion 14 into the closed position with respect to first portion 12. Bridge portion 18 is already in place with leading sheet material 30 extending around roller 22. Slack portion 44 may be seen in sheet material 30 between the connection thereof with leader 42 and roller 22. When apparatus 10 is completely closed, roller 24 is positioned adjacent roller 22 and sheet materials 30 and 36 are frictionally engaged between the rollers. Slack portion 44 in material 30 may be seen to include leading edge 46 and trailing edge 48, whereas material 36 extends directly from its connection with leader 42 to its frictional engagement with material 30 between rollers 22 and 24. As leader 42 is manually advanced in the direction indicated by the arrow in FIG. 4, material 36 is advanced therewith since it is connected directly to leader 42. Material 30 is also advanced in a like manner since it is frictionally engaged with material 36 between rollers 22 and 24. That is, material 30 is not advanced because of its connection with leader 42 but rather because material 36 is being advanced and is frictionally engaged with material 30. The two strips emanating from rolls 26 and 28 are thus drawn into superposition after passing through rollers 22 and 24, but are not in the desired longitudinal registration due to slack portion 44 in material 30.

Figure 5A:
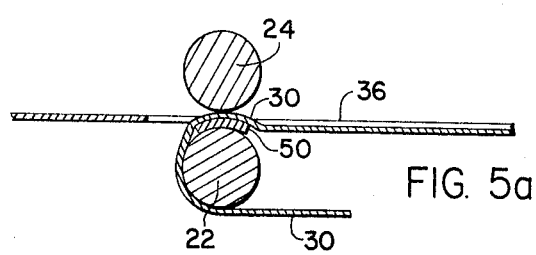
FIG. 5a is an enlarged, fragmentary view of a portion of the assembly, in section on the line 5a—5a of FIG. 7.

The present invention includes means for insuring that slack portion 44 will be removed from material 30 before photosensitive area 32 is advanced into superposition with processing area 38. Such means include spacer elements 50 which are attached to material 30, and elongated slots 52 which are formed in material 36. As seen in FIG. 5a, spacer elements 50 are advanced between rollers 22 and 24 as material 30 continues to be advanced due to its frictional engagement between the rollers with material 36. Due to the additional thickness of spacer elements 50, rollers 22 and 24 are forced apart by a greater amount when spacer elements 50 are drawn therebetween. As best seen in the plan views of FIGS. 6 and 7, spacer elements 50 are laterally positioned on material 30 in registration with the lateral position of slots 52 in material 36.

It will also be noted that slots 52 are somewhat wider than spacer elements 50. Thus, the spacer elements, or the portion of material 30 to which the elements are attached, may protrude through slots 52 when spacer elements 50 are brought between rollers 22 and 24. Also, the thickness of spacer elements 50 is greater than the thickness of material 36. Consequently, materials 30 and 36 are no longer frictionally engaged with one another due to the compressive force of rollers 22 and 24 since the rollers are now spread apart by a distance greater than the combined thickness of materials 30 and 36. Only material 30 and spacer elements 50 are engaged between rollers 22 and 24 since the additional thickness produced by the spacer elements projects through slots 52. This may be seen more clearly in the side sectional view of FIG. 5a.

When the roll has been advanced to the point where spacer elements 50 are engaged between rollers 22 and 24, further advancement of leader 42 will advance only material 36, and consequently roll 28. Material 36 is advanced as before due to its direct connection with leader 42. The frictional engagement between materials 30 and 36 has been reduced sufficiently by spreading the rollers in the manner indicated so that material 30 is no longer advanced through the rollers by advancement of material 36. The portion of material 30 which is attached directly to leader 42 is advanced therewith, but the portion of material 30 rearward (on the left-hand side as seen, for example, in FIG. 5) of slack portion 44 is not advanced. That is, advancement of leader 42 now advances both materials 30 and 36, but only that portion of material 30 forward (on the right-hand side as seen in FIG. 5) of slack portion 44.

This may be clearly seen from the plan views of FIGS. 6 and 7. In FIG. 6 spacer elements 50 have just been engaged between rollers 22 and 24, and leading and trailing edges 46 and 48, respectively, of slack portion 44 may be seen in dotted lines. As leader 42 is advanced from the position shown in FIG. 6, both materials 30 and 36 are advanced from their respective connections with the leader. Slack portion 44 begins to be removed from material 30, and as leader 42 continues to be advanced the slack portion is entirely removed. This condition is shown in FIG. 7, wherein it may be seen that both materials 30 and 36 now extend directly from their respective connections with leader 42 without slack in either material. Further advancement of leader 42 from the position shown in FIG. 7 will result in advancement of both materials 30 and 36 due to their direct connections with leader 42 and not due to the frictional engagement of one material with the other between rollers 22 and 24. Since both materials 30 and 36 now extend directly from their respective connections with leader 42, with no slack in either material, the strips from rolls 26 and 28 will be in the desired longitudinal registration as they are advanced into superposition between the rollers.

Elements 50 are attached to material 30 on the side thereof which brings elements 50 into contact with roller 22 as the material is advanced. As seen in FIG. 5a, when elements 50 are positioned between rollers 22 and 24 the portions of material 30 to which elements 50 are attached are distorted somewhat to conform to the general shape of elements 50 between the rollers. This may also be seen in FIG. 5 wherein elements 50 are hidden beneath material 30 which is distorted to extend through slots 52 in material 36. The same effect, i.e., reducing the frictional engagement of materials 30 and 36 by spreading rollers 22 and 24 further apart, could be achieved by attaching elements 50 to the opposite side of material 30 and allowing elements 50 to extend directly through slots 52. However, with such an arrangement there is a greater likelihood of elements 50 catching on portions of photographic apparatus 10 as the materials are advanced therethrough. Also, depending upon the manner in which elements 50 are secured to material 30, there may be a greater likelihood of the elements becoming unsecured from the material as the elements pass around the radius of roller 22.

Elements 50 are shown in the drawings as being generally rectangular in shape. This configuration may be altered if desired. A number of other configurations may be used, for example, to make elements 50 more flexible so that they conform more easily to the curvature of roller 22. For example, the edges of elements 50 which are parallel to the longitudinal axis of material 30 may be notched or tapered, or the elements may be made in a dumbbell configuration having a relatively narrow central portion, in order to achieve the desired flexibility.

It is also to be noted that the previously described function of elements 50 and slots 52 could be achieved with a single element and slot rather than the two side-by-side elements and slots shown. However, a portion of the photographic apparatus wherein film rolls of the type herein described are most commonly used extends into the path of movement of the lateral center of the rolls; there is thus a greater likelihood of a centrally disposed element or slot in the advancing materials being caught on such a portion. A radius or taper at one or both ends of slots 52 also may decrease the likelihood that the edges of the slots will be caught on any of the elements of the photographic apparatus as the film roll is advanced therethrough. Thus, the configuration of elements 50 and slots 52 and the location thereof may be altered as desired to improve the operation of the invention in a particular photographic apparatus as determined by the normal structure of such apparatus.

As seen in FIGS. 5a and 7, when leader 42 has been advanced to the point where materials 30 and 36 extend directly therefrom with no slack, elements 50 are near the trailing edges of slots 52. The length for which slots 52 extend forwardly to their leading edges is dependent upon the amount of slack which is likely to be encountered in material 30. That is, the amount of misregistration which may be corrected by the present invention is a function of the length of slots 52. It has been found that a slot length of about 3½″ is sufficient to correct for any misregistration of the type described which is encountered in normal use. As previously mentioned, the minimum width of slots 52 is a function of the width of elements 50, since the slots must be wider than the elements. The maximum width of slots 52 is limited only by the desired tensile strength of the width of material 36 which remains after the material in slots 52 has been removed.

The present invention thus provides means for insuring that a plurality of elongated strip materials which comprise a composite photographic film roll will be in proper longitudinal registration with one another as the roll is advanced through a well-known form of photographic apparatus. The invention is particularly desirable in film rolls such as those herein described where each of the two rolls contains a number of longitudinally separated areas which are to be superposed with one another in proper longitudinal registration as the film roll is advanced through photographic apparatus.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite photographic product adapted to be employed in photographic apparatus having a pair of pressure-applying members, said product comprising, in combination, first and second strips of flexible sheet materials, means for advancing said first and second strips between said pressure-applying members in superposition, said strips being urged by said pressure-applying members into frictional engagement with one another, and means associated with at least one of said strips and movable therewith to a position between said members, and effective to separate the latter in such manner as to release said frictional engagement during a preselected portion of the advancement of said strips, the release of said frictional engagement allowing one of said strips to be advanced independently of at least a portion of the other of said strips.

2. The invention according to claim 1 wherein said preselected portion comprises a portion of the advancement of said strips relatively near the beginning thereof.

3. A composite photographic product including two rolls of flexible sheet materials adapted to be unwound and advanced in superposed, frictional engagement between a pair of pressure-applying members, said product comprising, in combination, means defining at least one elongated opening in a first of said sheet materials, the long axis of said opening being in the direction of travel of said materials between said pressure-applying members, and spacer means attached to the second of said sheet materials in lateral registration with said opening and having a thickness greater than said first sheet material, said spacer means being effective to separate said pressure-applying members upon passing therebetween and reduce said frictional engagement between said sheet materials from said first and second rolls, thereby permitting the material from said first roll to be moved between said pressure-applying members independently of the material from said second roll.

4. A composite photographic product adapted to be employed in photographic apparatus having a pair of pressure-applying members between which said product may be advanced, said product comprising, in combination, first and second rolls of flexible sheet materials, a flexible strip of leader material, means for attaching end portions of both said first and second rolls to said leader whereby, upon advancement of said leader material, said rolls are unwound and said sheet materials are advanced through said apparatus in superposed relation and are frictionally engaged between said pressure-applying members, and means associated with said sheet materials and forming structural portions thereof, said means being effective when advanced to a position between said members to separate the latter in such manner as to release said frictional engagement during at least a portion of said advancement, whereby any slack existing in one of said sheet materials between said pressure-applying members and the attachment of said one sheet with said leader material will be removed by advancing said leader material, and thereby the other of said sheet materials, during said portion of the advancement.

5. A composite photographic product suited for employment in photographic apparatus having a pair of pressure-applying members between which said product may be advanced, said product comprising, in combination, a first strip of flexible sheet material, a second strip of flexible sheet material, leader means to which both said first and second strips are so attached that upon advancement of said leader means through said photographic apparatus both said first and second strips are advanced in superposed relationship and in frictional engagement between said pressure-applying members, said first strip including at least one elongated opening having a long axis parallel to the direction of advancement of said product, and said second strip including spacer means in registration with said opening when said first and second strips are superposed and adapted to separate said pressure-applying members by an amount greater than the thickness of said first strip whereby, upon separation of said pressure-applying members by said spacer means and advancement of said leader means, said first strip may be advanced while said second strip is advanced only to the extent of such slack as may be present therein between said leader means and said pressure-applying members.

6. The invention according to claim 5 wherein said first strip includes a plurality of longitudinally separated first areas of image-receptive photographic material, and said second strip includes a plurality of longitudinally separated second areas of photosensitive material, said first and second areas being in superposition when said first and second strips are in said predetermined longitudinal relationship.

7. The invention according to claim 6 wherein said spacer element is attached to said second strip between the connection thereof with said leader element and the first of said plurality of second areas.

8. A composite photographic product for use in photographic apparatus having a pair of pressure-applying members, said product comprising, in combination, first and second elongated, flexible strips of photographic material, a flexible leader element, means connecting one end of each of said first and second strips to one end of said leader element whereby, when said first and second strips are extended from their connection with said leader element, a first surface of said first strip is superposed with a first surface of said second strip in predetermined longitudinal relationship, at least one elongated opening in said first strip having a long axis parallel to that of said first strip, and a spacer element attached to said second strip in registration with said opening in said first strip when the two strips are superposed, said spacer element having a thickness greater than that of said first strip and a length and width less than the length and width, respectively, of said opening.

9. The invention according to claim 8 wherein said opening is located between the connection between said first strip and said leader element and the first of said plurality of first areas.

10. The invention according to claim 9 wherein said spacer element is attached to the surface of said second strip opposite to that surface which is superposed with said first strip.

References Cited by the Examiner

UNITED STATES PATENTS

| | | | |
|---|---|---|---|
| 2,778,734 | 1/1957 | Fairbank | 96—76 X |
| 2,871,777 | 2/1959 | Lothrop et al. | 95—89 |
| 2,873,659 | 2/1959 | Bing et al. | 95—13 |
| 3,135,187 | 6/1964 | Mason et al. | 95—89 |

NORTON ANSHER, *Primary Examiner.*

C. B. PRICE, *Assistant Examiner.*